United States Patent Office 3,315,402
Patented Apr. 25, 1967

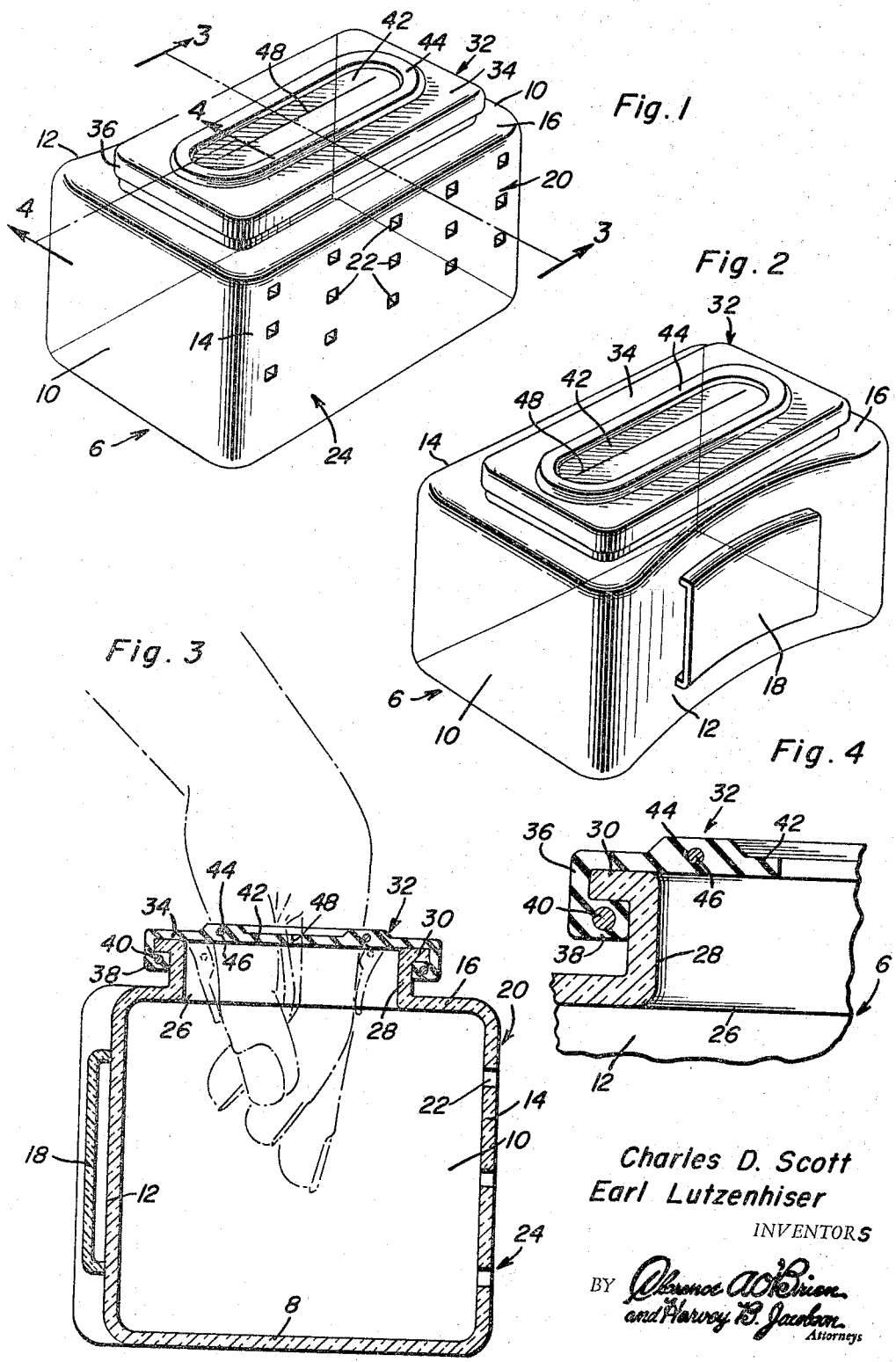

3,315,402
LIVE BAIT CONTAINER WITH IMPROVED COVER
Charles D. Scott and Earl Lutzenhiser, Helena, Mont., assignors of three-sixteenths to Leo J. Kottas, one-fourth to Sam Copenhaver, and one-eighth to Frank Griffin, all of Helena, Mont.
Filed Oct. 1, 1964, Ser. No. 400,728
6 Claims. (Cl. 43—55)

This invention relates to a personal-size portable live bait container characterized by a structurally unique box and new and improved readily applicable and removable cover means therefor.

Briefly, the container comprises a simple, practical and economical box having means whereby it can be readily attached to and supported on the angler's trousers belt. The top wall of the box has a hand hole and an upstanding rigid neck whose mouth portion is provided with a lateral cover attaching and retaining flange. The neck is amply large that the user's hand can be passed by way of the hand hole into the bait chamber or receptacle portion. The cover means is functionally and structurally unique. It comprises a molded rubber or equivalent cap-type lid or cover having a slitted diaphragm surrounded by an endless upstanding reinforced bead. The lip portions of the slit are normally closed but can be forcibly spread apart by the user's hand to obtain access to the bait chamber.

In carrying out the concept the container is transparent and has a contoured body-adapting inward side wall carrying the belt loop. The opposed outward wall has its upper half-portion perforated to provide air vents. The lower half-portion is imperforate. The container portion or chamber can be used to store live winged bait (such as grasshoppers, salmon flies, trout flies, cricket flies and so on) and in addition, other live bait, (worms, crayfish, frogs, sand crabs and the like) in the bottom half-portion. For best results the angler may charge the bottom part with water, moss, sand and so on. Accordingly, this simple vented container is versatile in that it provides for selective use of the kind of bait most suitable for the fishing job at hand.

The cover means is significant. To this end, a cap-type lid or cover has been found to be ideally feasible. The marginal part has a depending skirt or rim with a lateral turned in reinforced flange amply elastic that it can be snapped in place and held in place on the neck through the medium of the holddown attaching flange. More importantly, the central portion of the lid or cover has an endless ovate reinforced upstanding bead defining a flexibly resilient correspondingly shaped diaphragm. The latter spans the mouth portion of the neck and has a normally closed pressure opened slit. It follows that access to the bait in the chamber is permitted simply by thrusting the fingers of the hand through the slot and withdrawing the bait chosen for use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of the improved live bait container and the readily attachable and detachable special cover means provided thereon;

FIGURE 2 is a view in perspective similar to FIG. 1 but observing the inward side; that is, the side which is provided with the trousers belt attaching loop;

FIGURE 3 is a cross-section on a slightly enlarged scale, taken on the plane of the section line 3—3 of FIG. 1; and FIGURE 4 is a fragmentary enlarged sectional view taken on the section line 4—4 of FIG. 1.

The improved container is denoted by the numeral 6 and preferably comprises a onepiece generally rectangular bait box of appropriate size and capacity, one which can be readily attached to the angler's trousers belt and conveniently and reliably supported thereby. This box or container is of onepiece sheet material construction. It can be manufactured from suitable moldable or formable plastic material. The fact that it is transparent, so that the contents of the box can be readily seen, makes it advisable to construct the box of an appropriate grade of plastic material. The box comprises a flat bottom wall 8, upstanding end walls 10 and opposed side walls, more particularly, an inward side wall 12 which is imperforate and arcuately shaped as shown in FIG. 2 and and outer flat front wall 14. The top wall is denoted at 16. It will be observed that the median part of the curvate inner side wall 12 is provided (see FIG. 2) with an integral or otherwise suitably mounted belt loop 18, one which serves to accommodate the angler's body encircling or trousers belt. The outer or front wall 14 has its upper half-portion 20 provided with rows of suitably arranged apertures or holes which constitute air vents and these are denoted at 22. The lower half-portion 24 is imperforate. With this construction it will be evident that the lower half-portion 24 adapts the lower part of the receptacle portion or chamber for reception of water, moss, dirt, sand, grass or the like. Accordingly, when thus prepared this lower portion adapts itself to store rock worms, earthworms, night crawlers, crayfish, frogs, sand crabs, helgramites and so on. On the other hand, when the box or chamber portion is empty it lends itself to storage of winged bait such as grasshoppers, salmon flies, trout flies, crickets and so on. The upper wall 16 is centrally provided with a hand-hole 26 of a size suitable to permit the hand to be passed or inserted therethrough as suggested in FIG. 3. An integral upstanding neck 28 is provided and this encompasses the margin of the hand-hole and extends at right angles above the plane of the top wall 16 with the upper brim portion provided with an outstanding endless attaching and retaining flange 30 for the applicable and removable cover means 32.

The cover means is preferably of onepiece construction. In practice, it has been made from rubber but could of course be made from an appropriate grade of commercial plastics. This cover takes the form of a lid of cap-like form. The lid proper is denoted at 34 and the outer marginal edge portions are provided with a depending skirt-like member 36 referred to here as a rim, the bottom thereof being provided with a turned in retaining flange 38. This flange is reinforced by an embedded wire rod or the like 40. While this flanged rim is sturdy it is nevertheless amply flexible and resilient that it can be readily snapped into place and removed for cleaning the interior of the box. It can be mentioned here that by using a readily applicable and removable vent-type cover it can be replaced by a substitute cover such as will no doubt be made available by the manufacturer. The median part of the lid or cover is fashioned into an elongated generally ovate portion designated here as a diaphragm 42. This diaphragm is defined by a circumscribing upstanding thickened rib or bead 44 having a reinforcing wire 46 centrally embedded therein as shown in FIG. 4. Thus a reinforced diaphragm accommodatingly provides for an elongated centralized slit 48 which is capable of being pressed open in the manner suggested in FIG. 3 by hand pressure. Normally, the inherent resiliency of the components of the diaphragm serve to cause the lips to abut each other. Accordingly, the slot 48 is normally closed.

It will be evident from the disclosure that by inserting the fingers of one hand through the slit an entrance opening is provided. Therefore, the user can reach into the container portion by way of the opened slit, select (because of the transparency of the box) the desired bait and then withdraw the same for use. The slot or slit automatically closes. It follows that this featured construction prevents the escape of bait which so often happens with other types of bait buckets, bait boxes and the like with or without specially constructed lids.

In use it will be evident that the bait box is strapped on the belt of the user (not shown) with the air vents facing outwardly and the cover or lid can be readily removed for loading the container portion with a desired kind of bait. The lid can then be replaced thus closing the box in the manner shown. Whenever a bait is desired all that the user has to do is to reach into the container space by way of the pressure opened slit or slot, select the desired bait and withdraw it for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A live bait container comprising: a portable box including a top wall provided with an upstanding neck defining a hand-hole marginally surrounded by said neck and permitting ready access, at least one wall of said box being provided with perforations constituting air vents, another wall of said box having means for detachably supporting said box on the person of the user, and cover means comprising a readily attachable and detachable onepiece caplike rubber lid, the latter having reinforced rim means around the marginal edges for attachment to and retention on said neck, the lid portion proper having an elongated elastic diaphragm circumscribed and delineated by an upstanding endless reinforced bead, said diaphragm being aligned with the mouth portion of said neck and being provided with a normally closed elongated expansible and contractible pressure responsive slit having abutting lips, and said reinforced bead being spaced outwardly from said slit and spaced inwardly from said reinforced rim means.

2. A container for live bait comprising an elongated box embodying top, bottom, side and end walls, the outer side wall having its upper half-portion perforated and providing vents and its lower half-portion imperforate, the inner side wall having a trousers belt attaching loop, said top wall including an upstanding integral neck defining a hand hole marginally encompassed by said neck, the brim of said neck having a lateral outstanding cover attaching flange, and cover means comprising a readily attachable and detachable onepiece, cap-like rubber lid, the latter having reinforced rim means around the marginal edges for attachment to and retention on said neck, the lid portion proper having an elongated elastic diaphragm circumscribed and delineated by an upstanding endless reinforced bead, said diaphragm being aligned with the mouth portion of said neck and being provided with a normally closed elongated expansible and contractible pressure responsive slit having abutting lips, and said reinforced bead being spaced outwardly from said slit and spaced inwardly from said reinforced rim means.

3. In combination, a bait box having a top wall provided with a flanged neck, a readily attachable and detachable onepiece cap-type rubber lid, the latter having reinforced rim means around the marginal edges releasably attaching and securing said lid on said neck, the lid portion proper having an elongated elastic diaphragm circumscribed and delineated by an upstanding endless reinforced bead, said diaphragm being aligned with the mouth portion of said neck and being provided with a normally closed elongated expansible and contractible pressure responsive slit having abutting lips, and said reinforced bead being spaced outwardly from said slit and spaced inwardly from said reinforced rim means.

4. In combination with a container including portions marginally encompassing and defining an opening in said container, a panel-like closure member including a reinforced outer peripheral rim portion removably secured to said portions of said container, said panel-like member being constructed of deformable and resilient material and including an elongated endless reinforcing belt spaced inwardly of said rim portion and marginally encompassing an area within said belt, said area being registered with said opening and provided with a normally closed, elongated, expansible and contractible pressure responsive slit defining closely adjacent opposing lips on opposite sides of said slit.

5. The combination of claim 3 wherein said box includes transparent side walls.

6. The combination of claim 5 wherein at least one of said side walls includes an upper portion provided with perforations and the lower portions of said side walls are imperforate.

References Cited by the Examiner

UNITED STATES PATENTS

| | | | |
|---|---|---|---|
| 1,150,776 | 8/1915 | Lamb | 43—55 |
| 1,698,018 | 1/1929 | Hendricks | 43—55 |
| 2,203,203 | 6/1940 | Lyon | 43—55 |
| 2,560,381 | 7/1951 | Babington | 43—55 X |
| 2,597,002 | 5/1952 | Johnson et al. | 43—55 |
| 2,644,269 | 7/1953 | Ormesher | 43/55 |
| 2,732,653 | 1/1956 | McGee | 43—55 |
| 3,048,317 | 8/1962 | Cochrane et al. | 220—60 X |

FOREIGN PATENTS

| | | |
|---|---|---|
| 1,126,967 | 8/1956 | France. |

SAMUEL KOREN, *Primary Examiner.*

D. J. LEACH, *Assistant Examiner.*